United States Patent
Balike et al.

(10) Patent No.: US 12,385,400 B2
(45) Date of Patent: Aug. 12, 2025

(54) METHOD OF MANUFACTURING A MISTUNED ROTOR

(71) Applicant: PRATT & WHITNEY CANADA CORP., Longueuil (CA)

(72) Inventors: Krishna Prasad Balike, Brampton (CA); Edwin Wong, North York (CA); Daniel Fudge, Vaughan (CA); Ignatius Theratil, Mississauga (CA); Paul Stone, Guelph (CA); Charles Mason, Milton (CA); Karan Anand, Mississauga (CA); Pascal Doran, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/661,454

(22) Filed: Apr. 29, 2022

(65) Prior Publication Data
US 2023/0349297 A1    Nov. 2, 2023

(51) Int. Cl.
*F01D 5/16*    (2006.01)
*B23H 9/10*    (2006.01)
*F01D 5/14*    (2006.01)

(52) U.S. Cl.
CPC .............. *F01D 5/16* (2013.01); *B23H 9/10* (2013.01); *F01D 5/141* (2013.01);
(Continued)

(58) Field of Classification Search
CPC ............. F01D 5/16; F05D 2240/303; F05D 2240/304; F05D 2240/305; F05D 2260/961
See application file for complete search history.

(56) References Cited

U.S. PATENT DOCUMENTS 4,118,147 A * 10/1978 Ellis .................... F01D 5/16
                                                                416/500
6,042,338 A    3/2000 Brafford et al.
(Continued)

FOREIGN PATENT DOCUMENTS

EP    1211383 A2    6/2002
EP    3184746 A1    6/2017
(Continued)

OTHER PUBLICATIONS

European Search Report issued in counterpart application 23170157.4 on Sep. 12, 2023.

*Primary Examiner* — Brian Christopher Delrue
(74) *Attorney, Agent, or Firm* — NORTON ROSE FULBRIGHT CANADA LLP (57) ABSTRACT

A method includes: obtaining a rotor having a hub and a plurality of blades protruding from the hub, the plurality of blades including first blades and second blades disposed in alternation around a central axis of the rotor, natural vibration frequencies of the first blades different from natural vibration frequencies of the second blades; determining that a difference between a first natural vibration frequency of a first blade of the first blades and a second natural vibration frequency of a second blade of the second blades is below a threshold; and modifying a shape of the first blade until the difference between the first natural vibration frequency and the second natural vibration frequency is at or above the threshold.

20 Claims, 5 Drawing Sheets

(52) U.S. Cl.
CPC .. *F05D 2240/303* (2013.01); *F05D 2240/304* (2013.01); *F05D 2240/305* (2013.01); *F05D 2260/961* (2013.01)

(56) References Cited

U.S. PATENT DOCUMENTS

| | | | |
|---|---|---|---|
| 6,814,543 B2 | 11/2004 | Barb et al. | |
| 8,171,632 B2 | 5/2012 | Kuehhorn et al. | |
| 9,970,298 B2* | 5/2018 | Le Strat | F16F 15/32 |
| 10,215,194 B2* | 2/2019 | Theratil | F01D 5/16 |
| 10,584,591 B2* | 3/2020 | Opoka | F04D 29/327 |
| 10,598,017 B2* | 3/2020 | Gerez | F01D 5/027 |
| 10,865,807 B2* | 12/2020 | Theratil | F01D 5/16 |
| 10,920,594 B2 | 2/2021 | Tarquinio et al. | |
| 11,041,388 B2* | 6/2021 | Li | F01D 5/141 |
| 2002/0064458 A1* | 5/2002 | Montgomery | F04D 29/666 415/208.3 |
| 2004/0241003 A1 | 12/2004 | Roy et al. | |
| 2009/0035149 A1* | 2/2009 | Sun | F04D 25/0613 416/244 R |
| 2009/0155082 A1 | 6/2009 | Duong et al. | |
| 2010/0166550 A1 | 7/2010 | Devangada et al. | |
| 2011/0164982 A1* | 7/2011 | Wilson | B23K 15/0053 416/198 A |
| 2016/0053617 A1* | 2/2016 | Grelotti | F02C 3/04 416/175 |
| 2016/0208823 A1 | 7/2016 | Chrabascz et al. | |
| 2017/0138306 A1* | 5/2017 | Miller | F04D 29/362 |
| 2017/0138307 A1* | 5/2017 | Miller | F02K 3/06 |
| 2017/0175776 A1* | 6/2017 | Theratil | F04D 29/327 |
| 2018/0135635 A1* | 5/2018 | Staroselsky | F02C 3/04 |
| 2018/0274557 A1* | 9/2018 | Theratil | F01D 5/16 |
| 2018/0274559 A1* | 9/2018 | Theratil | F04D 29/325 |
| 2018/0363481 A1* | 12/2018 | Bailey | F04D 29/362 |
| 2019/0107123 A1* | 4/2019 | Veitch | F04D 29/666 |
| 2020/0102827 A1 | 4/2020 | Morris et al. | |
| 2020/0141242 A1* | 5/2020 | Nolcheff | B23P 15/04 |
| 2022/0316358 A1* | 10/2022 | Oga | F02C 7/06 |

FOREIGN PATENT DOCUMENTS

| | | |
|---|---|---|
| WO | 20060084438 A1 | 8/2006 |
| WO | 2021150579 A1 | 7/2021 |

* cited by examiner

METHOD OF MANUFACTURING A MISTUNED ROTOR

TECHNICAL FIELD

The disclosure relates generally to turbine engines and, more particularly, to rotors, such as integrally bladed rotors.

BACKGROUND

Compressor rotors of gas turbine engines, such as the fan of a turbofan, may experience two main types of aerodynamic instability: stall flutter and supersonic flutter. Stall flutter (sometimes simply called "flutter") is sub-sonic or transonic and may occur when two or more adjacent blades in a blade row vibrate at a frequency close to their natural vibration frequency and the vibration motion between the adjacent blades is substantially in phase. Stall flutter also typically occurs over a limited speed band. Supersonic flutter occurs in the high speed regime of the compressor or fan where tip speed is very high. Supersonic flutter may occur under certain flight conditions. Prolonged operation of a fan or compressor rotor undergoing supersonic flutter can produce a potentially undesirable result caused by airfoil stress load levels exceeding threshold values.

Improvements are therefore sought.

SUMMARY

In one aspect, there is provided a method comprising: obtaining a rotor having a hub and a plurality of blades protruding from the hub, the plurality of blades including first blades and second blades disposed in alternation around a central axis of the rotor, natural vibration frequencies of the first blades different from natural vibration frequencies of the second blades; determining that a difference between a first natural vibration frequency of a first blade of the first blades and a second natural vibration frequency of a second blade of the second blades is below a threshold; and modifying a shape of the first blade until the difference between the first natural vibration frequency and the second natural vibration frequency is at or above the threshold.

The method may include any of the following features, in any combinations.

In some embodiments, the method includes identifying a zone on the first blade, the modifying of the shape of the first blade including modifying the shape of the first blade by modifying the shape of the first blade within the zone.

In some embodiments, the modifying of the shape of the first blade within the zone includes removing matter from the first blade within the zone.

In some embodiments, the modifying of the shape of the first blade includes modifying a shape of a pressure side of the first blade.

In some embodiments, the modifying of the shape of the first blade includes modifying the shape of the first blade within a zone on an aerodynamic surface of the first blade.

In some embodiments, the modifying of the shape of the first blade within the zone includes modifying the shape of the first blade within the zone located radially outwardly of a mid-span line of the first blade.

In some embodiments, the modifying of the shape of the first blade within the zone includes modifying the shape of the first blade within the zone being offset from a leading edge of the first blade.

In some embodiments, the modifying of the shape of the first blade within the zone includes modifying the shape of the first blade within the zone being offset form a trailing edge of the first blade.

In some embodiments, the modifying of the shape of the first blade within the zone includes modifying the shape of the first blade by creating a recessed area within the zone.

In some embodiments, the creating of the recessed area includes increasing a depth of the recessed area from a perimeter of the zone toward a location within the zone, a depth of the recessed area being maximal at the location.

In some embodiments, the location is offset from a center of the zone.

In another aspect, there is provided a rotor comprising: a hub having a central axis; and a plurality of blades protruding from the hub and including: first blades circumferentially distributed around the central axis, and second blades disposed in alternation with the first blades around the central axis, a first natural frequency of a first blade of the first blades differing from a second natural frequency of a second blade of the second blades adjacent the first blade, at least one of the first blades having a modified shape different from a baseline shape of a remainder of the first blades, the modified shape differing from the baseline shape at a zone on the at least one of the first blades.

The rotor may include any of the following features, in any combinations.

In some embodiments, the modified shape is substantially identical to the baseline shape but for the zone.

In some embodiments, the at least one of the first blades defines a recessed area within the zone.

In some embodiments, a depth of the recessed area increases from a perimeter of the zone toward a location within the zone, a depth of the recessed area maximal at the location.

In some embodiments, the location is offset from a center of the zone.

In some embodiments, the zone is located radially outwardly of a mid-span line of the at least one of the first blades.

In some embodiments, the zone is offset from a leading edge of the at least one of first blades and from a trailing edge of the at least one of the first blades.

In some embodiments, the zone is located on a pressure side of the at least one of the first blades.

In some embodiments, the hub and the plurality of blades are parts of a single monolithic body.

BRIEF DESCRIPTION OF THE DRAWINGS

Reference is now made to the accompanying figures in which.

DETAILED DESCRIPTION

Figure 1:
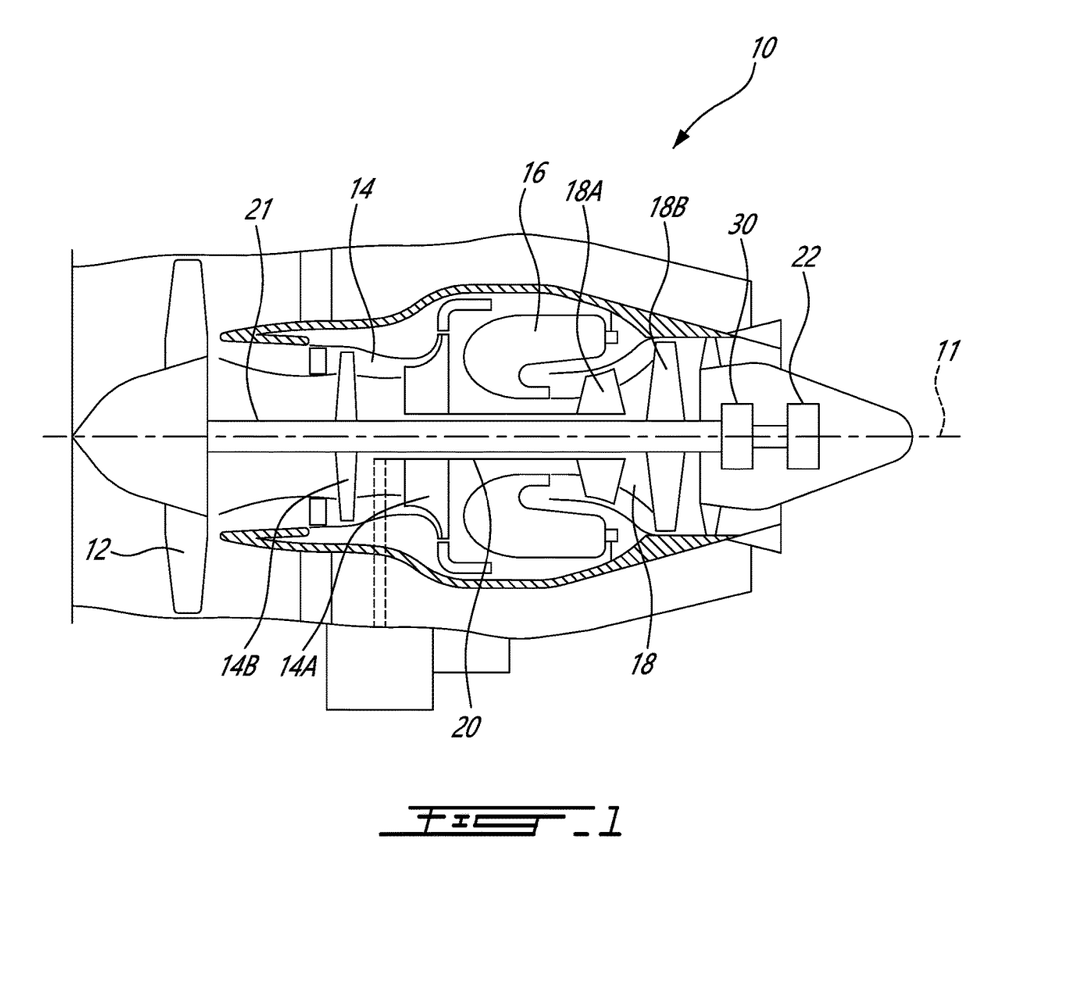
FIG. 1 is a schematic cross-sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section to a low-pressure compressor 14B of the compressor section 14 and drivingly engaged to the fan 12. It will be understood that the contents of the present disclosure may be applicable to any suitable engines, such as turboprops and turboshafts, and reciprocating engines, such as piston and rotary engines without departing from the scope of the present disclosure. Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. A turboprop engine may also apply. In addition, although the engine 10 is described herein for flight applications, it should be understood that other uses, such as industrial or the like, may apply.

Figure 2:
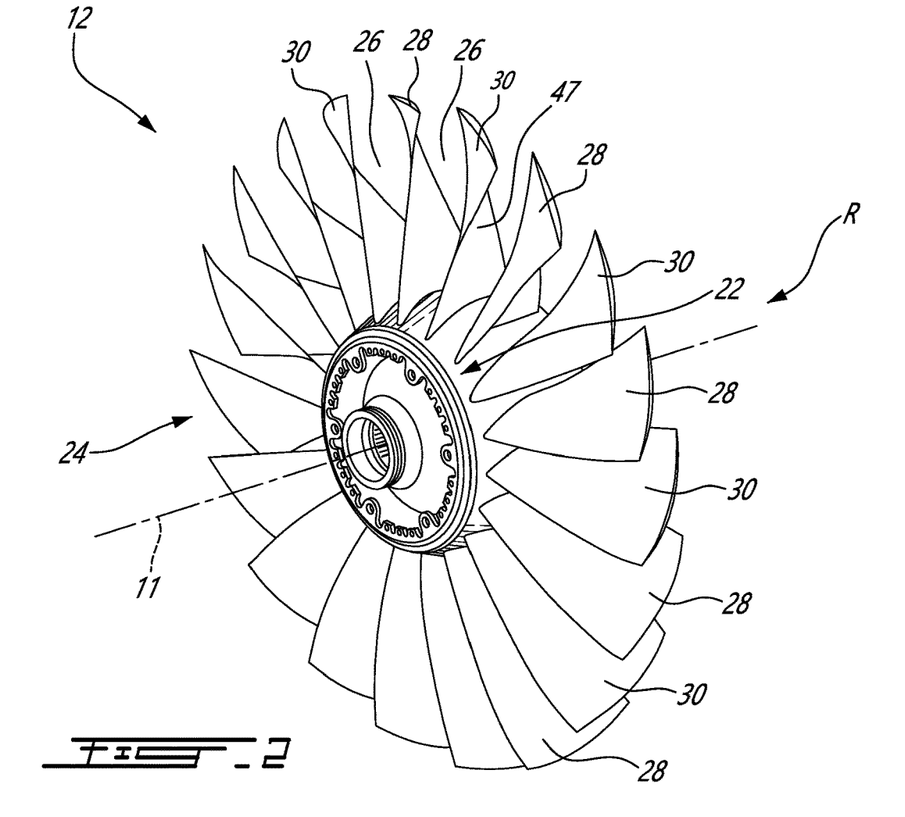
FIG. 2 is a three dimensional view of a frequency mistuned integrally bladed rotor of the gas turbine engine shown in FIG. 1.

FIG. 2 illustrates a rotor R of the gas turbine engine 10, which herein corresponds to the fan 12 of the gas turbine engine 10, which is sometimes referred to as a first stage or low pressure compressor. It will be appreciated that the principle of the present disclosure may apply to any rotor of the gas turbine engine 10 such as, for instance, a compressor rotor, an impeller, to name a few. In some embodiments, the fan 12 is a mistuned integrally bladed rotor with slightly different alternating blade geometries. This difference in geometry is to achieve different natural frequencies between the blades which may prevent unstalled supersonic flutter of the fan blades.

In the embodiment shown, the fan 12 includes a central hub 22, which in use rotates about the central axis 11, and a circumferential row of fan blades 24 that are circumferentially distributed and which project from the hub 22 in a span-wise direction (which may be substantially radially). The fan 12 may be either a bladed rotor, wherein the fan blades 24 are separately formed and fixed in place on the hub 22, or the fan 12 may be an integrally bladed rotor (IBR), wherein the fan blades 24 are integrally formed with the hub 22. In other words, the hub 22 and the blades 24 may be parts of a single monolithic body. Such an integrally bladed rotor is also referred to as a BLISK (Bladed Disk). Each circumferentially adjacent pair of the fan blades defines an interblade passage 26 therebetween for the working fluid.

The circumferential row of fan blades 24 of the fan 12 includes two or more different types of fan blades 24, in the sense that a plurality of sets of blades are provided, each set having airfoils with non-trivially different mechanical properties, including but not limited to natural vibrational frequencies. More particularly, these two or more different types of fan blades 24 are composed, in this example, of successively circumferentially alternating sets of fan blades, each set including at least first and second fan blades 28 and 30 (the blades 28 and 30 having airfoils that are different from one another). More than two sets of blades may be used. The different blades are distributed around the central axis 11 (e.g. A-B-A-B; A-B-C-A-B-C; etc.).

In some embodiments, the first and second blades 28, 30 may have identical geometries and may be mistuned by being made of different materials. Any suitable ways of mistuning the first blades 28 from the second blades 30 are contemplated.

Figure 3:
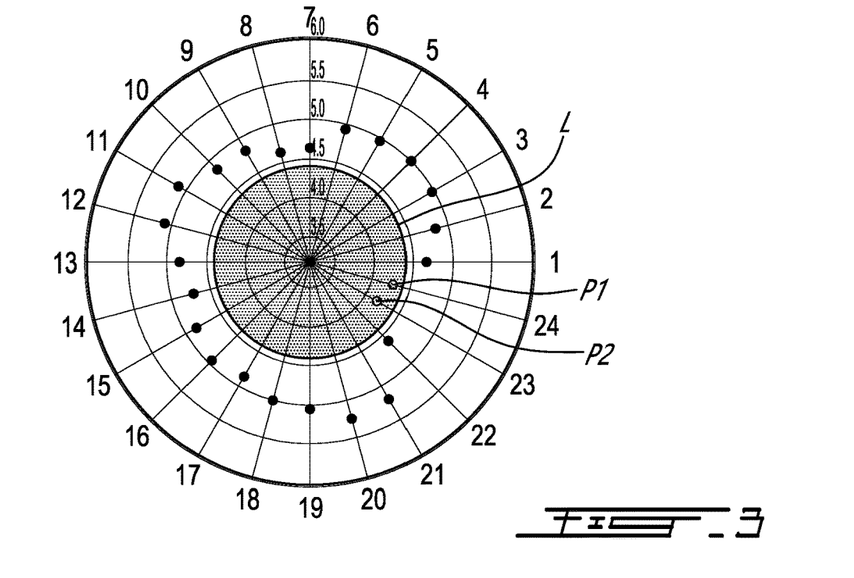
FIG. 3 is a graph illustrating natural frequency difference between each two circumferentially adjacent blades of the rotor of FIG. 2.

The flutter may be effectively prevented only when the frequencies of alternating blades differ by a minimum value. Functional analysis is performed on each of the manufactured fan to assess their functional requirements. FIG. 3 presents results of this analysis. As illustrated, the rotor analysed, and for which FIG. 3 present the results of this analysis, does not meeting the frequency separation functional requirement. More specifically, two blades represented by points P1 and P2 on FIG. 3 may not be sufficiently mistuned from one another. Stated differently, the difference in natural vibration frequency between these blades is below a given threshold (represented by line L), which is undesired. This may occur because of manufacturing tolerances or other manufacturing parameters. The present disclosure presents a method of re-working such machined rotor which otherwise may have to be discarded due to non-compliance. In other words, because the blades are a monolithic part of the rotor with the hub, it may not be possible to simply substitute a new blade.

Figure 4:
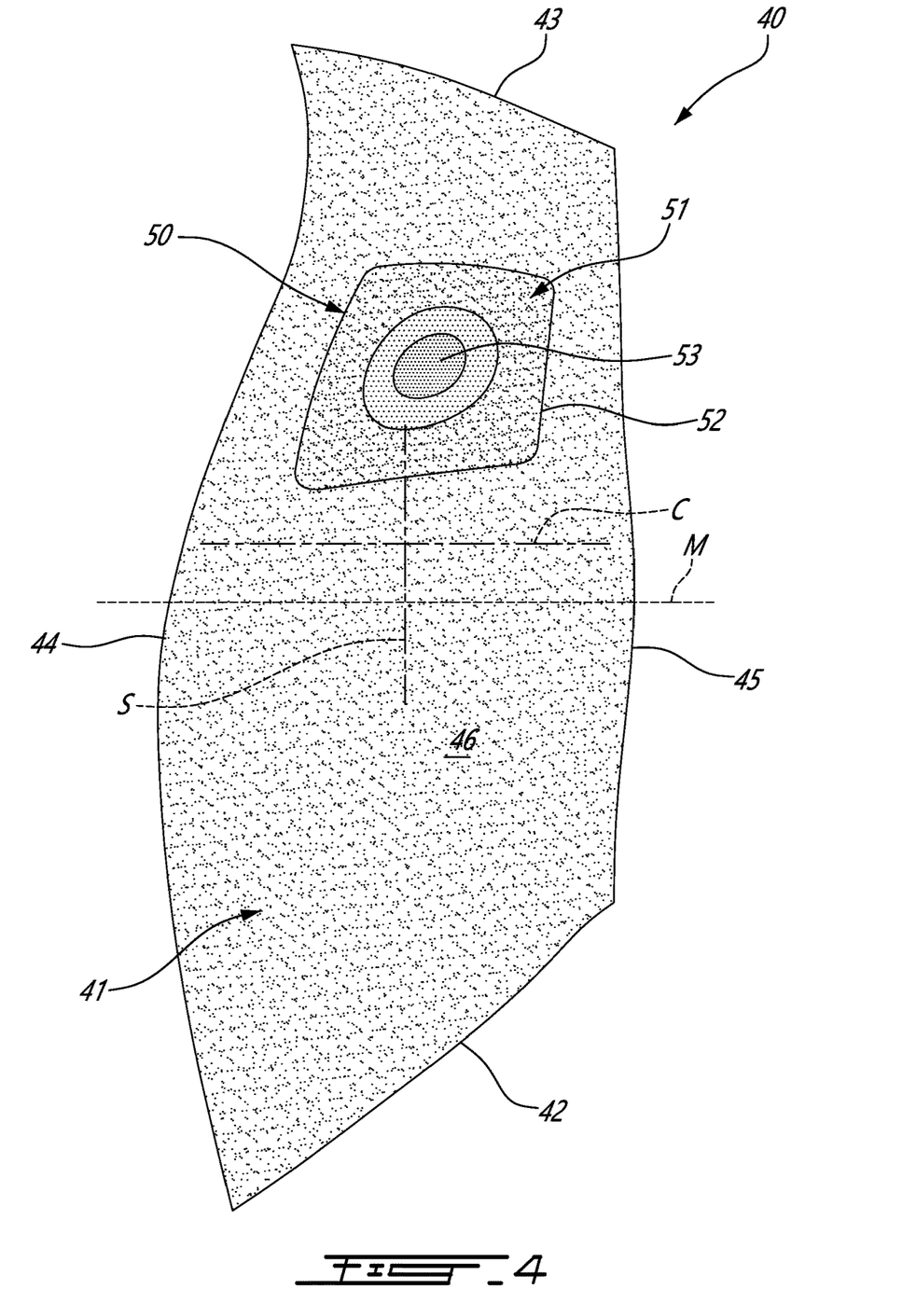
FIG. 4 is a plan view of one of the blades of the rotor of FIG. 2.

Referring to FIG. 4, a blade is shown at 40. The blade 40 may be one of the first blades 28 or one of the second blades 30 of the rotor R (e.g., fan 12). The blade 40 has an airfoil 41 that extends from a base 42 to a tip 43. The blade 40 has a leading edge 44 and a trailing edge 45 downstream of the leading edge 44 relative to a direction of a flow through the fan 12. The blade 40 has a pressure side 46 that extends from the base 42 to the tip 43 along a spanwise axis S and that extends from the leading edge 44 to the trailing edge 45 along a chordwise axis C. The blade 40 as a suction side 47 (FIG. 2) opposite the pressure side 46 and that that extends from the base 42 to the tip 43 along the spanwise axis S and that extends from the leading edge 44 to the trailing edge 45 along the chordwise axis C.

The blade 40 may correspond to one of either the first blades 28 or the second blades 30 that has been modified to meet mistuning requirements. In other words, the blade has a modified shape that substantially corresponds to a baseline shape of either the first blades 28 or the second blades 30. In the present embodiment, the modified and baseline shapes differ from one another at a zone 50 on the blade 40. Put differently, the modified shape is substantially identical to the baseline shape but for the zone 50. Herein, the expression "substantially" implies that some minor differences may be present because of manufacturing tolerances. These differences in shapes may be invisible to the naked eye. Thus, a major portion of the blade 40 may be substantially identical to a corresponding major portion of either the first blades 28 or the second blades 30. Herein, the expression "major" implies an entirety of a surface of the blade 40 but for the zone 50. Herein, "substantially identical" implies that differences between the two blades outside the zone 50 would be less than from about 0.010 inch to about 0.02 inch at any point. Herein, "about" implies variations of plus or minus 10%.

In the embodiment shown, the zone 50 has a substantially rectangular shape with rounded corners. However, any other suitable shapes (e.g., trapezoid, square, triangular, circular, ellipsoid, etc.) may be used. A rectangular or square shape may be simpler to design because it may have symmetry on two axes. The zone 50 may be substantially centered between the leading and trailing edges 44, 45.

In the present embodiment, the blade 40 defines a recessed area 51 within the zone 50. Therefore, a surface of the blade 40 may be offset from a baseline surface of the blade 40 within the recessed area 51. A distance between the surface of the blade 40 within the zone 50 and the baseline surface of the blade 40 may define a depth of the recessed area 51. Thus, for creating the modified shape of the blade 40, material may be removed from the zone 50 of the blade 40. In some other embodiments, material may be added (e.g., bonded, brazed, fastened, welded, etc.) to the zone 50 of the blade 40.

In the embodiment shown, the zone 50 is located radially outwardly of a mid-span line M. The zone 50 is herein offset from the leading edge 44 of the airfoil 41 and offset from the trailing edge 45 of the airfoil 41. In some other embodiments, the zone 50 may extend up to the leading edge 44 and/or up to the trailing edge 45. The zone 50 is herein located on the pressure side 46 of the airfoil 41. Alternatively, the zone 50 may be located on the suction side 47 of the airfoil 41. In some other embodiments, the zone 50 may include a plurality of zones separated from one another; these zones being located on the pressure side 46 and/or the suction side 47. In some embodiments, it may be preferable to have the zone 50 on the pressure side rather than on the suction side for aerodynamics reasons. The zone 50 may occupy from 3% to 30%, preferably about 10%, of a surface area of the pressure side of the airfoil 41.

Figure 5:
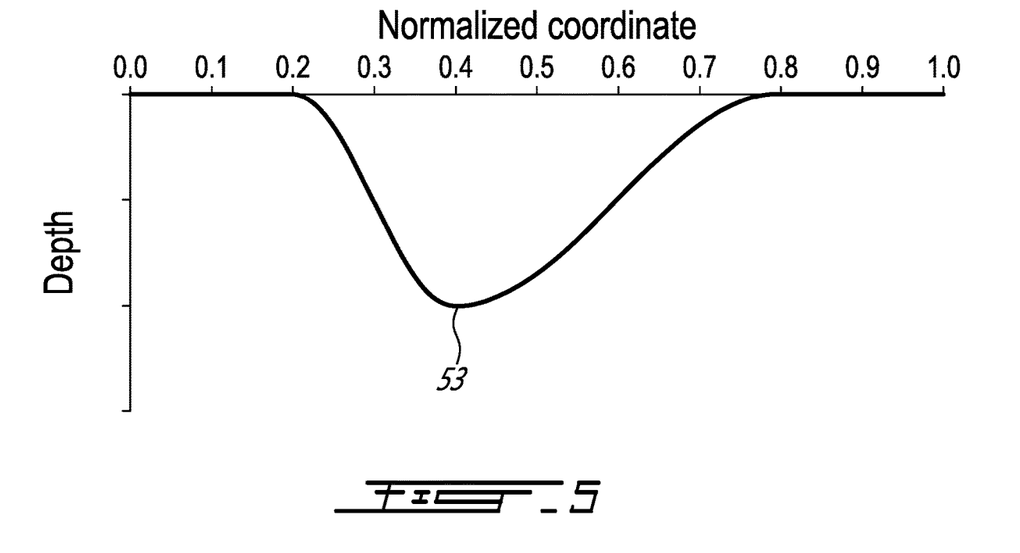
FIG. 5 is a graph illustrating a variation of a depth of a zone of the blade of FIG. 4 as a function of a chordwise position.
Figure 6:
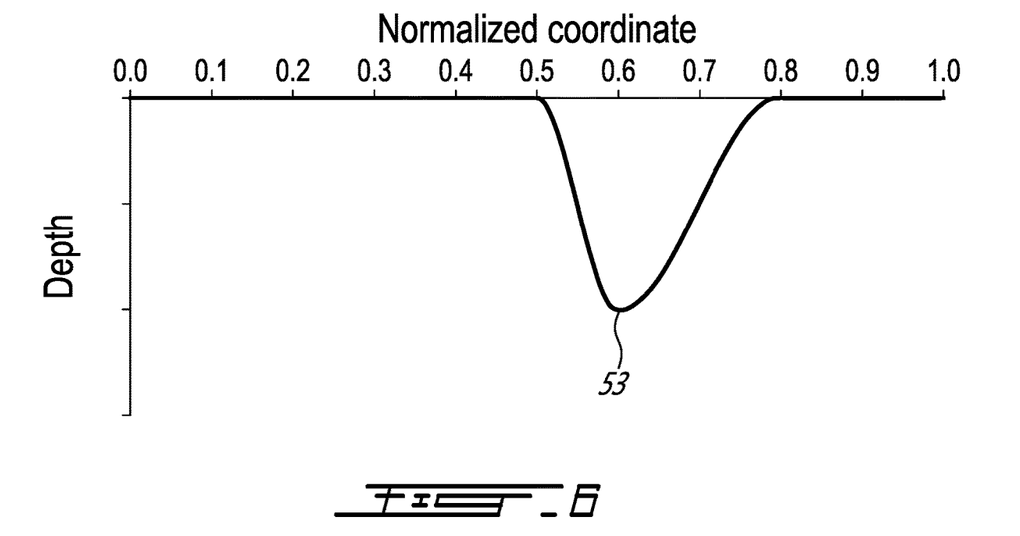
FIG. 6 is a graph illustrating a variation of the depth of the zone of the blade of FIG. 4 as a function of a spanwise position.

Referring now to FIGS. 5-6, depth distributions are shown along the chordwise axis C (FIG. 5) and along the spanwise axis S (FIG. 6). As illustrated, a depth of the recessed area 51 at the zone 50 increases from a perimeter 52 of the zone 50 to a location 53 where the depth is maximal. This location 53 may correspond to a center of the zone 50, or as shown in FIGS. 5-6, is offset from said center. As shown, the maximal depth is about 0.02 inch. Herein, "about" implies variations of plus or minus 10%. In the embodiment shown, a ratio of a maximum depth of the zone 50 to a maximum thickness of a baseline shape the blade (i.e., without the zone 50) ranges from 0.01 to 0.1. This maximum thickness is taken at a spanwise location registering with the location 53.

On FIG. 5, the abscissa denotes the chordwise position from the leading edge 44 at 0 to the trailing edge 45 at 1. As illustrated in FIG. 5, a rate of variation of the depth is greater from the leading edge 44 to the location 53 of greatest depth than from the location 53 to the trailing edge 45. The recessed area 51 may merge smoothly to the baseline surface of the airfoil 41 at the perimeter 52 of the zone 50. In the disclosed embodiment, the location 53 of greatest depth is closer to the leading edge 44 than to the trailing edge 45. The location 53 may be at about 40% of a chord of the airfoil 41 from the leading edge 44. The chord is taken at a corresponding spanwise position of the location 53. In some embodiments, a maximum depth and a location (chordwise position, spanwise position) of the location 53 of maximum depth is determined first. A remainder of the shape of the zone 50 is determined after such that the zone 50 merges smoothly into a remainder of the blade.

On FIG. 6, the abscissa denotes the spanwise position from the base 42 at 0 to the tip 43 at 1. As illustrated in FIG. 6, a rate of variation of the depth is greater from the base 42 to the location 53 of greatest depth than from the location 53 to the tip 43. The recessed area 51 may merge smoothly to the baseline surface of the airfoil 41 at the perimeter 52 of the zone 50. In the disclosed embodiment, the location 53 of greatest depth is closer to tip 43 than to the base 42. The location 53 may be at about 60% of a span of the airfoil 41 from the base 42. The span is taken at a corresponding chordwise position of the location 53.

The thickness distribution of the zone 50 in the chordwise and spanwise directions may be any suitable distribution such as, for instance, sinusoidal, quadratic, etc.

Figure 7:
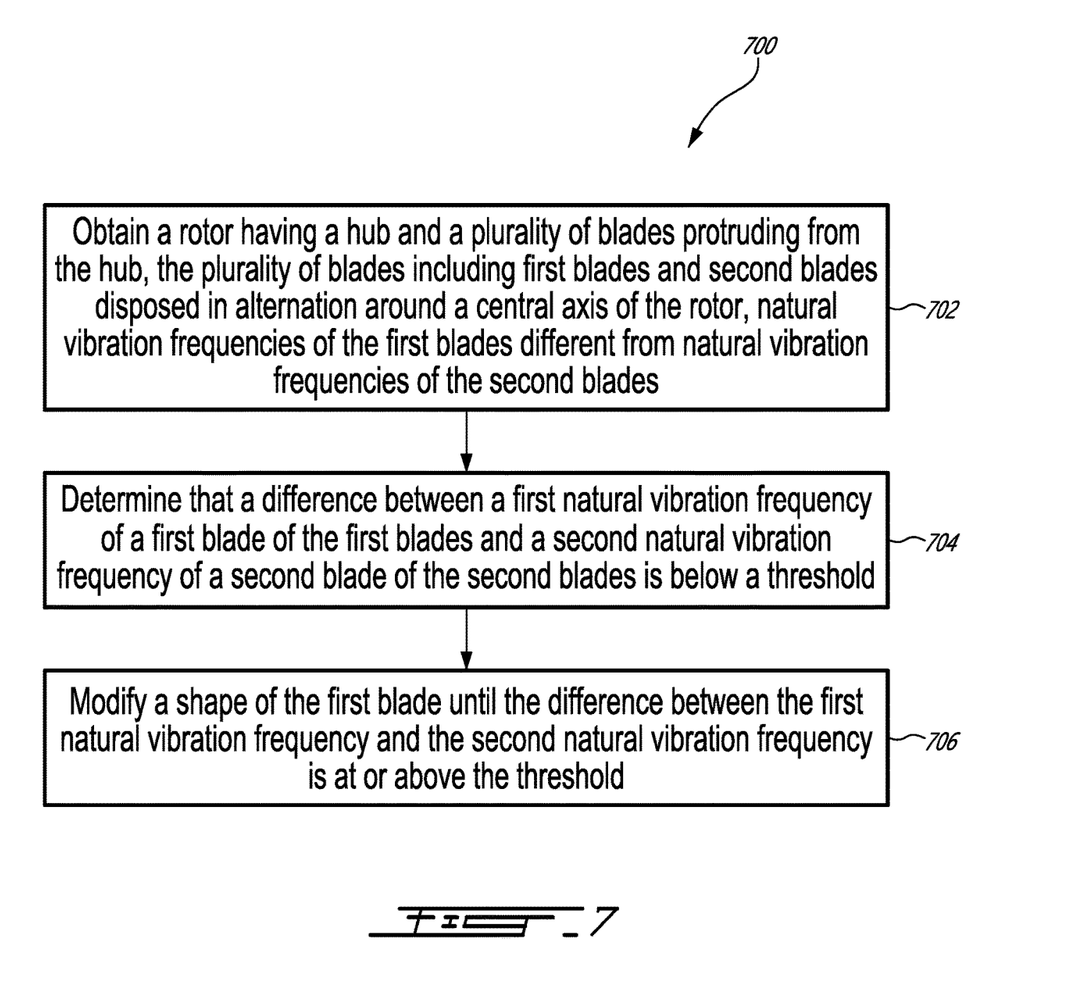
FIG. 7 is a flowchart illustrating steps of a method of manufacturing a rotor, such as a fan or compressor rotor, in accordance with one embodiment.

Referring now to FIG. 7, a method of manufacturing the rotor R is shown at 700. The method 700 includes obtaining the rotor R having the hub and the plurality of blades protruding from the hub, the plurality of blades including first blades 28 and second blades 30 disposed in alternation around the central axis 11, natural vibration frequencies of the first blades different from natural vibration frequencies of the second blades at 702; determining that a difference between a first natural vibration frequency of a first blade of the first blades and a second natural vibration frequency of a second blade of the second blades is below a threshold at 704; and modifying a shape of the first blade until the difference between the first natural vibration frequency and the second natural vibration frequency is at or above the threshold. The determining that the difference between the natural vibration frequencies is below the threshold at 704 may include identifying which pair of adjacent blades have their natural vibration frequencies differing by less than the threshold.

The method 700 may include identifying the zone 50 on the first blade 40, the modifying of the shape of the first blade 40 may include modifying the shape of the first blade by modifying the shape of the first blade 40 within the zone 50. This may be done by removing matter from the first blade within the zone 50. In some embodiments, the modifying of the shape of the first blade 40 includes modifying a shape of the pressure side 46 of the first blade 40. Any aerodynamic surface of the first blade 40 may be modified (e.g., suction side 47, tip 43, etc.). In some embodiments, both blades may be modified to achieve the desired difference in natural vibration frequencies.

In the present embodiment, the modifying of the shape of the first blade within the zone 50 includes modifying the shape of the first blade 40 within the zone 50 located radially outwardly of the mid-span line M of the first blade 40. The modifying of the shape of the first blade 40 within the zone 50 may include modifying the shape of the first blade 40 within the zone 50 being offset from the leading edge 44 of the first blade 40. The modifying of the shape of the first blade 40 within the zone 50 may include modifying the shape of the first blade 40 within the zone 50 being offset form the trailing edge 45 of the first blade 40. The modifying of the shape of the first blade 40 within the zone 50 may include modifying the shape of the blade by creating the recessed area 51 within the zone 50. The creating of the recessed area 51 may include increasing the depth of the recessed area 51 from the perimeter 52 of the zone 50 toward the location 53 within the zone 50 where the depth of the recessed area 51 is maximal.

In some embodiments, it may be required to compensate a rotational imbalance created by the removal of material from the zone 50. This may be done using, for instance, counterweights. Alternatively, or in combination, a blade located at a diametrically opposed location of the blade that defines the zone 50 may also be modified to remove material to create a similar zone. This may alleviate the rotational imbalance. This may further help an overall mistuning of the rotor.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method comprising:
    manufacturing a rotor having a hub and a plurality of blades protruding from the hub, the plurality of blades including first blades and second blades disposed in alternation around a central axis of the rotor to form pairs, a pair of the pairs including a first blade of the first blades disposed adjacent to a second blade of the second blades, the first blades having a natural vibration frequency differing from a natural vibration frequency of the second blades by a frequency difference for mistuning the rotor, the rotor being an integrally bladed rotor such that the plurality of blades and the hub are parts of a monolithic body of the rotor;
    performing an analysis on the monolithic body of the rotor with the plurality of blades and the hub to obtain actual frequency differences for each of the pairs;
    determining that an actual frequency difference corresponding to the pair of the pairs is below a minimum threshold; and
    re-working the integrally bladed rotor by modifying a shape of one or more of the first blade and the second blade of the pair such that a modified frequency difference between natural vibration frequencies of the first blade and the second blade of the pair is at or above the threshold;
    wherein the modifying of the shape of the first blade of the pair includes modifying the shape of the first blade within a zone on an aerodynamic surface of the first blade by creating a recessed area within the zone;
    wherein the creating of the recessed area includes increasing a depth of the recessed area from a perimeter of the zone toward a location within the zone, a depth of the recessed area being maximal at the location; and
    wherein a chordwise rate of variation of the depth is greater from the leading edge to the location of greatest depth than from the location to the trailing edge.

2. The method of claim 1, comprising identifying a zone on the first blade of the pair, the modifying of the shape of the first blade of the pair including modifying the shape of the first blade by modifying the shape of the first blade within the zone.

3. The method of claim 2, wherein the modifying of the shape of the first blade of the pair within the zone includes removing matter from the first blade within the zone.

4. The method of claim 1, wherein the modifying of the shape of the first blade of the pair includes modifying a shape of a pressure side of the first blade.

5. The method of claim 1, wherein the modifying of the shape of the first blade of the pair within the zone includes modifying the shape of the first blade within the zone located radially outwardly of a mid-span line of the first blade.

6. The method of claim 1, wherein the modifying of the shape of the first blade of the pair within the zone includes modifying the shape of the first blade within the zone being offset from a leading edge of the first blade.

7. The method of claim 6, wherein the modifying of the shape of the first blade of the pair within the zone includes modifying the shape of the first blade within the zone being offset form a trailing edge of the first blade.

8. The method of claim 1, wherein the location is offset from a center of the zone.

9. The method of claim 1, comprising compensating for a rotational imbalance created by the modifying of the shape of the first blade of the pair.

10. The method of claim 9, wherein the compensating for the rotational imbalance includes securing counterweights on the rotor.

11. A method comprising:
    manufacturing a rotor having a hub and a plurality of blades protruding from the hub, the plurality of blades including first blades and second blades disposed in alternation around a central axis of the rotor to form pairs, a pair of the pairs including a first blade of the first blades disposed adjacent to a second blade of the second blades, the first blades having a natural vibration frequency differing from a natural vibration frequency of the second blades by a frequency difference for mistuning the rotor, the rotor being an integrally bladed rotor such that the plurality of blades and the hub are parts of a monolithic body of the rotor;
    performing an analysis on the monolithic body of the rotor with the plurality of blades and the hub to obtain actual frequency differences for each of the pairs;
    determining that an actual frequency difference corresponding to the pair of the pairs is below a minimum threshold; and
    re-working the integrally bladed rotor by modifying a shape of one or more of the first blade and the second blade of the pair such that a modified frequency difference between natural vibration frequencies of the first blade and the second blade of the pair is at or above the threshold;
    wherein the modifying of the shape of the first blade of the pair includes modifying the shape of the first blade within a zone on an aerodynamic surface of the first blade by creating a recessed area within the zone;
    wherein the creating of the recessed area includes increasing a depth of the recessed area from a perimeter of the zone toward a location within the zone, a depth of the recessed area being maximal at the location; and
    wherein a spanwise rate of variation of the depth is greater from a base of the first blade to the location of greatest depth than from the location to a tip of the first blade.

12. The method of claim 11, comprising identifying a zone on the first blade of the pair, the modifying of the shape of the first blade of the pair including modifying the shape of the first blade by modifying the shape of the first blade within the zone.

13. The method of claim 12, wherein the modifying of the shape of the first blade of the pair within the zone includes removing matter from the first blade within the zone.

14. The method of claim 11, wherein the modifying of the shape of the first blade of the pair includes modifying a shape of a pressure side of the first blade.

15. The method of claim 11, wherein the modifying of the shape of the first blade of the pair within the zone includes modifying the shape of the first blade within the zone located radially outwardly of a mid-span line of the first blade.

16. The method of claim 11, wherein the modifying of the shape of the first blade of the pair within the zone includes modifying the shape of the first blade within the zone being offset from a leading edge of the first blade.

17. The method of claim 16, wherein the modifying of the shape of the first blade of the pair within the zone includes modifying the shape of the first blade within the zone being offset form a trailing edge of the first blade.

18. The method of claim 11, wherein the location is offset from a center of the zone.

19. The method of claim 11, comprising compensating for a rotational imbalance created by the modifying of the shape of the first blade of the pair.

20. The method of claim 19, wherein the compensating for the rotational imbalance includes securing counterweights on the rotor.

* * * * *